United States Patent [19]

Shogenji et al.

[11] Patent Number: 4,766,676
[45] Date of Patent: Aug. 30, 1988

[54] DRYER FOR DRYING EXTRUDABLE MATERIALS

[75] Inventors: Toshihiro Shogenji; Kenichi Takahashi, both of Kanagawa, Japan

[73] Assignee: Japan Butyl Company Limited, Kanagawa, Japan

[21] Appl. No.: 24,834

[22] Filed: Mar. 12, 1987

[30] Foreign Application Priority Data

Jun. 10, 1986 [JP] Japan .................. 61-132832

[51] Int. Cl.$^4$ ............................. F26B 17/20
[52] U.S. Cl. ........................ 34/70; 34/179; 425/207; 425/209; 366/77; 366/186
[58] Field of Search ............... 34/70, 179; 366/77, 366/186, 319; 425/207, 209

[56] References Cited

U.S. PATENT DOCUMENTS

| | | | |
|---|---|---|---|
| 3,856,278 | 12/1974 | Eisenmann | 425/209 |
| 4,057,379 | 11/1977 | Sato | 425/207 |
| 4,303,344 | 12/1981 | Muller | 366/77 |
| 4,446,094 | 5/1984 | Rossiter | 366/77 |

FOREIGN PATENT DOCUMENTS

| | | |
|---|---|---|
| 1139465 | 5/1980 | Canada . |
| 16-4462 | 3/1941 | Japan . |
| 51-6105 | 2/1976 | Japan . |
| 56-37055 | 8/1981 | Japan . |

Primary Examiner—Larry I. Schwartz
Attorney, Agent, or Firm—Albert L. Jeffers

[57] ABSTRACT

In a dryer for drying extrudable materials, a worm is rotatably disposed in a tubular sleeve which is equipped at its front portion with a hopper to supply extrudable materials. The worm is supported at its both ends by bearings in the sleeve or outside the sleeve. A seal screw is formed around the rear portion of the worm, and an outlet for discharging the extrudable material is formed on the side surface of the sleeve near the end of the seal screw. The end of the seal screw is connected with a flushing ring which is protruded from the end of the worm.

3 Claims, 1 Drawing Sheet

DRYER FOR DRYING EXTRUDABLE MATERIALS

BACKGROUND OF THE INVENTION

1. Field of the Invention

The present invention relates to a dryer for drying extrudable materials, which prevents metal pieces from entering into an extrudable material such as rubber, and which dries it efficiently until a desired water content is reached without permitting the quality of rubber to deteriorate.

2. Related Art Statement

In a conventional screw-type rubber dryer disclosed, for example, in Japanese Patent Publication No. 6105/1976, Japanese Patent Publication No. 37055/1981, Japanese Patent Publication No. 4462/1966, an extruding mechanism consisting of a worm without bearing is provided near the outlet for discharging the rubber. When the rubber is nonuniformly charged, however, the worm shaft swings or is deflected to a considerable degree, and the worm and the cylindrical sleeve often come into violent contact with each other. Therefore, it is inevitable that the contacted portions are worn out and metal pieces are peeled off to enter into the rubber, causing the quality of the rubber to be greatly deteriorated.

Prior to this invention there has been no effective solution for prevention of contact between the worm and the cylindrical sleeve.

SUMMARY OF THE INVENTION

The object of the present invention is to provide a dryer for drying extrudable materials, employing the structure in which the worm shaft is supported at its both ends by bearings so that the worm shaft will not come into contact with the tubular sleeve. The above object of the present invention is accomplished by a dryer for drying extrudable materials characterized in that a worm is rotatably disposed in a tubular sleeve which is equipped at its front portion with a hopper to supply extrudable materials such as rubber and the like, said worm being supported at its both ends by bearings in the sleeve or outside the sleeve, a seal screw is formed around the rear portion of said worm, and a discharge outlet for discharging the extrudable materials is formed in the side surface of said sleeve near the front end of said screw.

DETAILED DESCRIPTION OF THE INVENTION

Figure 1:
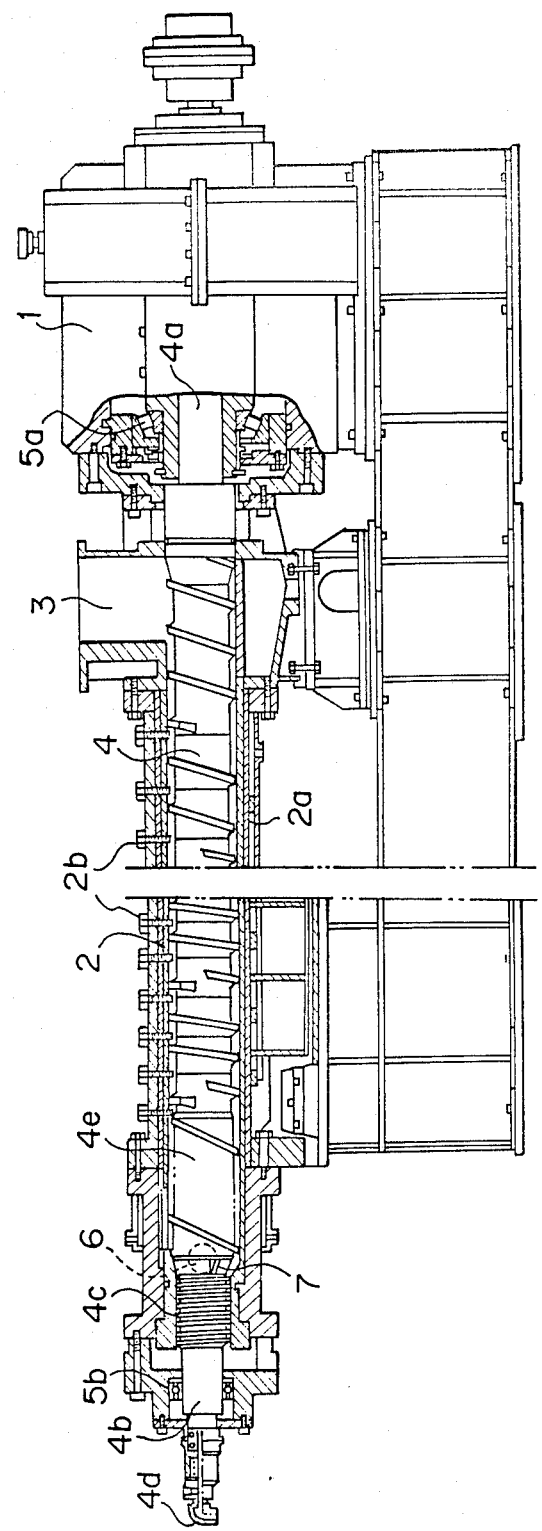
FIG. 1 is a side vertical section view of a rubber dryer according to an embodiment of the present invention.

The invention will now be described below in detail by way of an embodiment which treats the rubber in conjunction with the drawing. In FIG. 1, reference numeral 1 denotes a decelerating mechanism coupled to a drive mechanism that is not diagramed, 2 denotes a tubular sleeve provided at its front portion with a rubber hopper 3. A worm 4 is rotatably disposed in the sleeve 2. That is, a front end 4a and a rear end 4b of the worm 4 are supported by bearings 5a and 5b such as roller bearings inside or outside the sleeve. Preferably, the outer surface of the cylindrical sleeve 2 is surrounded by a heating jacket 2a, and the interior thereof is filled with steam etc.

Reference numeral 2b denotes breaker bolts. Further, a seal screw 4c is formed around the rear portion of the worm 4. To perfectly maintain the sealing performance, furthermore, provision is made of a cooling water circulating mechanism 4d to effect the local cooling.

A pressure-boosting extrusion worm 4e having a large lead is formed on the worm 4 in front of the seal screw 4c, in order to boost the pressure and to increase the efficiency for extruding the rubber. The tubular sleeve 2 is provided with an outlet 6 for discharging the rubber at the back of the worm 4 near the front end of the seal screw 4c. A flushing ring 7 is protruded from the rear end of the worm 4 so that the rubber will not stay in a space. Further, a cylinder cutter with dies is juxtaposed to the rubber discharge outlet 6. In its place, however, it is also allowable to arrange a fixed plate with dies in combination with a rotary cutter.

In the thus constructed dryer, the rubber which is dehydrated in advance to a water content of 5 to 20% by a hydroextractor that is not shown, is sent into the dryer through the hopper 3 and is subjected to the compression, kneading and heating repetitively by the worm 4 as it moves toward the discharge outlet 6. The rubber which is compressed and heated to 40 to 90 $kgf/cm^2G$ and 180° C. or higher, is allowed to blow through dies of the cylinder cutter mounted on the discharge outlet and instantaneously undergoes the distension, whereby the water vaporizes and the water content of rubber becomes 0.3%, preferably 0.15% or smaller. The rubber flue from the dies is cut into pieces by the cylinder cutter that rotates in the cylinder, and is discharged from a cylinder nozzle. In the above-mentioned embodiment, the cylinder cutter with dies was provided at the end of the discharge outlet 6. In its place however, it is also allowable to arrange a fixed plate with dies in combination with the rotary cutter.

According to the present invention in which both ends of the worm are supported by the bearings 5a and 5b, the worm 4 does not swing or is not deflected unlike that of the conventional art. Therefore, the worm is not brought into violent contact with the tubular sleeve 2, and metal pieces do not enter into the rubber, thereby making it possible to maintain the quality of rubber very high.

Moreover, the number of revolutions of the worm 4 can be freely increased to increase the amount of processing the rubber. As required, furthermore, it is allowed to greatly reduce the length of the worm 4 to increase its rigidity, from which strikingly improved effects can be expected. Owing to the combination of pressure-boosting extrusion worm 4e, seal screw 4c and flushing ring 7, furthermore, the rubber does not remain in the dryer. Namely, the rubber is not thermally deteriorated or is not deteriorated that may result when the rubber is compressed and kneaded in narrow gaps. The rubber can be efficiently discharged by the cylinder cutter with dies mounted on the discharge outlet, or by the fixed plate with dies in combination with the rotary cutter.

Though the above embodiment has dealt with the case where the rubber was dried, it should be noted that the present invention is in no way limited thereto only but can also be adapted to the fields of synthetic resins or foods in the form of extrudable materials.

What is claimed is:

1. A dryer for drying rubber having water content of 5 to 20% to obtain rubber having water content of 0.3% or smaller by blowing through dies the rubber compressed to 40 to 90 Kgf/cm$^2$G and heated to at least 180° C. but below a temperature that would unacceptably degrade the rubber comprising a worm rotatably disposed in a tubular sleeve which is equipped at its front portion with a hopper to supply rubber to be dried, said worm being supported at both of its ends by bearings connected to the sleeve, a seal screw formed around the rear portion of said worm, a water circulating means for cooling said seal screw, and an outlet to said dies for discharging rubber formed on the side surface at the sleeve near the front end of the seal screw, said end being connected with a flushing ring which protrudes from the end of the worm.

2. A dryer for drying rubber materials according to claim 1, wherein said flushing ring is provided on the outer surface of the worm near the outlet for discharging the rubber materials.

3. A dryer for drying rubber having water content of 5-20% to obtain rubber having water content of 0.3% or smaller by blowing the rubber compressed to 40 to 90 Kfg/cm$^2$G and heated to 180° C. or higher through dies comprising: a worm rotatably disposed in a tubular sleeve which is provided at its front portion with a hopper to supply rubber to be dried, said worm being supported at both of its ends by bearings in the sleeve or outside the sleeve, a seal screw formed around the rear portion of said worm, water circulating means for cooling said seal, and an outlet for discharging rubber through said sleeve near the front end of the seal screw, and a flushing ring having at least one protrusion thereon positioned at the end of the worm near said outlet.

* * * * *

UNITED STATES PATENT AND TRADEMARK OFFICE
CERTIFICATE OF CORRECTION

PATENT NO. : 4,766,676

DATED : August 30, 1988

INVENTOR(S) : Toshihiro Shogenji et al

It is certified that error appears in the above-identified patent and that said Letters Patent is hereby corrected as shown below:

Claim 2, Col. 3, line 17, delete "materials";
Claim 2, Col. 4, line 2, delete "materials".

Signed and Sealed this

Tenth Day of January, 1989

*Attest:*

DONALD J. QUIGG

*Attesting Officer*   *Commissioner of Patents and Trademarks*